May 30, 1967 — J. ROUTON — 3,321,865
MOISTURIZING TAPES
Filed June 18, 1965

INVENTOR.
JOSEPH ROUTON,
BY
Berman, Davidson & Berman
ATTORNEYS.

United States Patent Office 3,321,865
Patented May 30, 1967

3,321,865
MOISTURIZING TAPES
Joseph Routon, 912 Dunlap St., Paris, Tenn. 38242
Filed June 18, 1965, Ser. No. 465,051
6 Claims. (Cl. 47—55)

This invention relates to moisturizing tapes for wrapping cut flower stems.

One of the greatest problems confronting florists is the difficulty in getting cut funeral flowers to stay fresh for the one or two days desirable. Vases and baskets containing water offer no problem in this regard. However, practically all sprays, wreaths and easel designs are made up of flowers which are simply placed in styrofoam or straw-filled forms completely out of contact with water, so that such flowers normally stay fresh for only one full day in the funeral home, and are dead or in failing condition by the following day.

There are several devices now on the market for combatting the foregoing problems, such as, small plastic tubes, serving as picks, which must be individually filled with water and then capped, and "oases" in the form of foam bricks which hold a substantial amount of water. Both of these devices are effective, but expensive, and have several disadvantages.

Arrangements using "oases" are limited in size and shape because each flower stem must be stuck therein to get water therefrom, and when too many stems are present, the "oases" tend to crumble and the holding power thereof is lost. Other objections to the use of "oases" are their relatively great weight and the constant threat of dripping of water therefrom.

The pimary object of the invention is the provision of tapes of the kind indicated, the use of which eliminates the above-mentioned difficulties and disadvantages, the tapes being substantially less expensive to provide and use, and are adapted to be more quickly and easily applied, so as to effect substantial savings in time and work.

Another object of the invention is the provision of tapes of the character indicated above, which are adapted to be stored on and removed from, as wanted, spools or reels, the tapes being easily cut to the desired lengths by means of ordinary tape cutters, or alternatively, formed with perforated lines enabling the tearing off of the desired lengths.

A further object of the invention is the provision of tapes of the character indicated above, which comprise strips of paper, fabric, or other like suitable materials, coated with adhesive on one side thereof, the said one side bearing moisture-holding areas adapted to be moistened either by drawing the same over a moistener roller, sponge, or the like, or by dipping the taped flowers in water.

Figure 1:
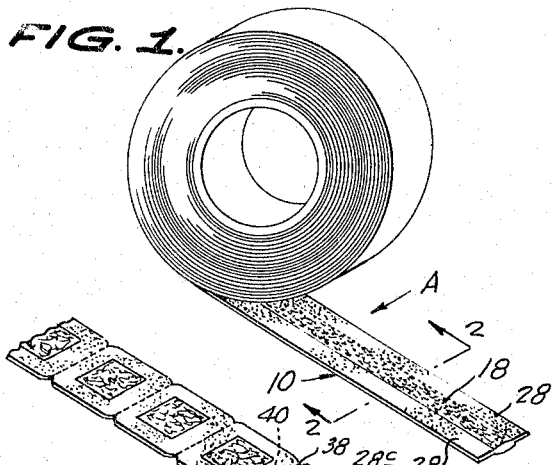
FIGURE 1 is a perspective view of a roll of tape according to the present invention.
Figure 2:
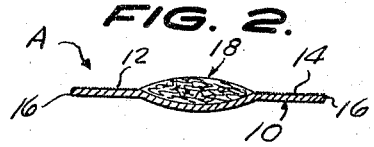
FIGURE 2 is an enlarged transverse section, taken on the line 2—2 of FIGURE 1.

Referring in detail to the drawing, and first, to FIGURES 1 and 2 thereof, A designates a form of tape of the invention which comprises a flexible strip 10 of paper similar to that used in masking tape, or of suitable fabric or other material, which is covered on one side 12 with suitable tacky adhesive 14, extending to the side edges 16 thereof. Adhered to the side 12 and equally-spaced from the side edges 16 is a linear body 18 of moisture-retaining material, of such sponge, cotton gauze, or tissue, or of any other suitable highly-absorbent material.

In use, the tape A is adapted to be wrapped around the upper end of a pick 20 secured to the lower part of a flower stem 22 as by means of wire 24 wrapped there-around, and around the lower part of the stem 22 with the side 12 facing these components, and in a position such that the absorbent water-retaining body 18 comes into contact with the diagonally-cut lower end 26 of the flower stem. The tape A is then wrapped around itself, so that the exposed adhesive areas 28, at the opposite sides of the adsorbent body 18, adhere to the outer side 30 of the strip 10. The outer side 30 of the strip 10 is preferably colored green to blend with the color of the flower stem 22.

The moisture-retaining body 18 is adapted to be wet in any suitable manner, as by drawing the same over a moisturizing sponge or roller (not shown) before application to the flower stem. Optionally, and more quickly, the body is adapted to be wet by dipping the assembled pick, flower stem and the tape wrapping in water. The moisture present in the moisture-bearing body 18 is absorbed by contact and by capillary attraction into the flower stem 22.

Figure 3:
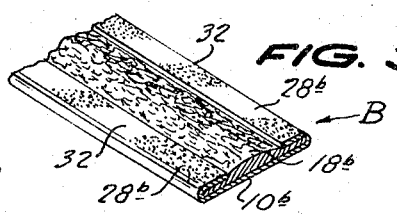
FIGURE 3 is a fragmentary perspective view of another form of tape of the present invention.

Another form of tape B, shown in FIGURE 3, is generally similar to that shown in FIGURES 1 and 2, except that the side edge areas of the strip 10b are turned inwardly over the moisture-bearing body 18b, and the adhesive areas 28b are provided by adhesive applied on the outer surfaces of the flanges 32, defined by the turned-over parts of the strip 10b. The double thicknesses of the strip 10b, provided by the flanges 32, gives the tape B greater proportional strength than the tape A, and the greater proportional width of the adsorbent body 18b, provides the tape B with greater moisture retaining capacity.

Figure 4:
FIGURE 4 is a perspective view, on a reduced scale, of a further form of tape.
Figure 5:
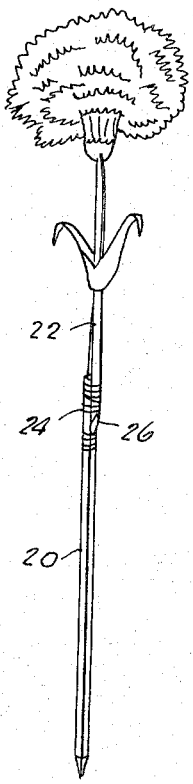
FIGURE 5 is a side elevation of a cut flower stem showing a pick secured thereto, and the cut end of the stem exposed.
Figure 6:
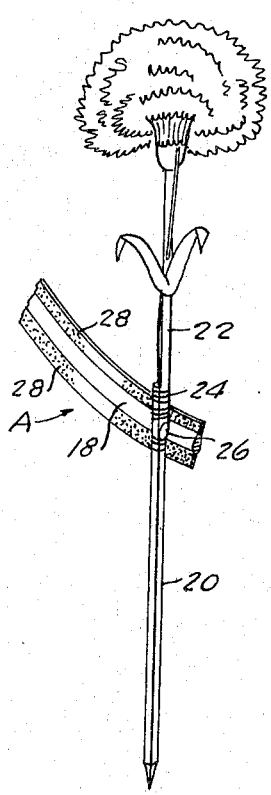
FIGURE 6 is a view like FIGURE 5, showing initial application of a tape to the flower stem, with the moisture-containing body of the tape engaged with the cut end of the stem.
Figure 7:
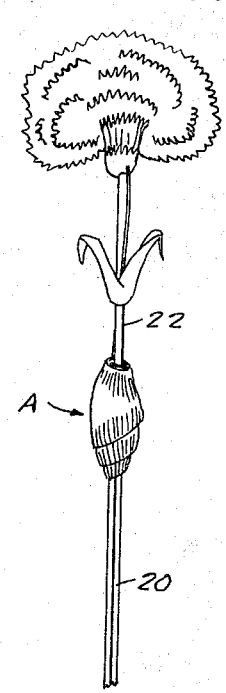
FIGURE 7 is a view like FIGURES 5 ond 6, showing the tape in wrapped and secured condition.

The form of tape C, shown in FIGURE 4, is similar to that of FIGURES 1 and 2, except that the linear absorbent body 18c is discontinuous, and is composed of preferably square portions 34 which are spaced from each other lengthwise of the strip 10c. Adhesive areas 28c on the strip 10c are located at the sides of the portions 34, and other adhesive areas 36 can be located between adjacent portions 34.

In addition, cutting off of the tape C to desired lengths is facilitated by providing the side edges of the strip 10c with V-shaped notches 38 midway between adjacent absorbent portions 34, the apices of these notches being aligned with transverse weakened or perforated tear lines 40.

What is claimed is:

1. In combination, a flower stem having a diagonally-cut lower end, a flat paper-like tape wrapped around the lower part of the flower stem, said tape having adhesive on the inner side thereof adhered to the outer side of the tape, said tape having absorbent moisture-bearing means on its inner side in moisture-transfer contact with the cut lower end of the stem, said tape comprising a flexible strip having inner and outer sides and side edges, said moisture-bearing means being secured to the inner side of the strip and being spaced from the side edges of the strip, said strip having adhesive areas extending therealong at opposite sides of the moisture-bearing means.

2. The combination of claim 1, wherein said strip has side edge portions, said side edge portions being bent inwardly onto said moisture-bearing means, said adhesive areas being on the exposed surfaces of said side edge portions.

3. The combination of claim 1, wherein said moisture-bearing means is a continuous linear body.

4. The combination of claim 1, wherein said strip has side edge portions, said side edge portions being bent inwardly onto said moisture-bearing means, said adhesive areas being on the exposed surfaces of said side edge portions, said moisture-bearing means being a continuous linear body.

5. The combination of claim 1, wherein said moisture-bearing means comprises portions spaced from each other lengthwise of the strip.

6. The combination of claim 1, wherein said moisture-bearing means comprises portions spaced from each other lengthwise of the strip, the side edges of the strip being formed with V-shaped notches located between adjacent portions of the moisture-bearing means, the strip being formed with transverse tear lines extending between aligned notches.

References Cited

UNITED STATES PATENTS

| 1,707,515 | 4/1929 | Evans | 128—268 |
| 3,212,495 | 10/1965 | Osbourn et al. | 128—2 |

FOREIGN PATENTS

| 14,685 | 1892 | Great Britain. |

ABRAHAM G. STONE, *Primary Examiner.*

R. E. BAGWILL, *Assistant Examiner.*